United States Patent [19]

Yatomi et al.

[11] 4,392,041
[45] Jul. 5, 1983

[54] ELECTRIC DISCHARGE MACHINING APPARATUS WITH A WIRE-SHAPED ELECTRODE

[75] Inventors: Takeshi Yatomi; Yutaka Tanaka, both of Aichi, Japan

[73] Assignee: Mitsubishi Denki Kabushiki Kaisha, Tokyo, Japan

[21] Appl. No.: 224,512

[22] PCT Filed: Mar. 21, 1980

[86] PCT No.: PCT/JP80/00047
§ 371 Date: Nov. 22, 1980
§ 102(e) Date: Nov. 21, 1980

[87] PCT Pub. No.: WO80/02003
PCT Pub. Date: Oct. 2, 1980

[30] Foreign Application Priority Data

Mar. 22, 1979 [JP] Japan .................................. 54-33577
Mar. 22, 1979 [JP] Japan .................................. 54-33578

[51] Int. Cl.³ ............................................. B23P 1/08
[52] U.S. Cl. .............................. 219/69 W; 219/69 G; 219/69 C
[58] Field of Search ............... 219/69 M, 69 V, 69 C, 219/69 G, 69 W, 69 D

[56] References Cited

U.S. PATENT DOCUMENTS 4,052,583 10/1977 Inoue ................................ 219/69 W
4,057,703 11/1977 Pfau .................................. 219/69 C
4,078,163 3/1978 Bell, Jr. et al. .................... 219/69 C

FOREIGN PATENT DOCUMENTS 52-47705 5/1977 Japan .............................. 219/69 W
54-47901 1/1979 Japan .............................. 219/69 W Primary Examiner—M. H. Paschall
Attorney, Agent, or Firm—Sughrue, Mion, Zinn, Macpeak and Seas

[57] ABSTRACT

In an electric discharge machining apparatus with a wire-shaped electrode for machining a workpiece by causing electrical discharge in a gap between the wire-shaped electrode and the workpiece and controlling a machining feed speed so that the voltage across the gap is constant, the machining area of the workpiece is detected from the machining feed speed. The thus detected data representative of the machining area are applied to an arithmetic unit which operates to instruct optimum electrical machining conditions according to the machining area, whereby the workpiece is machined under the optimum electrical conditions at all times.

27 Claims, 17 Drawing Figures

| t | Eci | $\bar{F}_U$ | $\bar{F}_D$ |
|---|---|---|---|
| $0 - t_0$ | Eco | $\bar{F}_0$ | $\bar{F}_0'$ |
| $t_0 - t_1$ | Ec1 | $\bar{F}_1$ | $\bar{F}_1'$ |
| $t_1 - t_2$ | Ec2 | $\bar{F}_2$ | $\bar{F}_2'$ |
| $t_2 - t_3$ | Ec3 | $\bar{F}_3$ | $\bar{F}_3'$ |
| $t_3 - t_4$ | Ec4 | $\bar{F}_4$ | $\bar{F}_4'$ |
| ⋮ | ⋮ | ⋮ | ⋮ |

0.5~1sec

ELECTRIC DISCHARGE MACHINING APPARATUS WITH A WIRE-SHAPED ELECTRODE

DESCRIPTION

BACKGROUND OF THE INVENTION

This invention relates to electric discharge machining apparatuses with a wire-shaped electrode for machining a workpiece by the use of electric discharge, and more particularly to a control device for use in the electric discharge machining apparatus, which is capable of optionally controlling machining electrical conditions according to variations in thickness of the workpiece and to the quality thereof.

In an electric discharge machining apparatus of this type, a metal wire about 0.05 to 0.3 mm in diameter is employed as its one electrode. Electrical discharge is caused between the electrode and a workpiece to be machined to melt the corresponding portion of the workpiece. The electrode is displaced relative to the workpiece in the X-Y plane to thereby electrically cut or cut a way the workpiece in a desired configuration. In this case, in general, the electrical discharge is carried out with a constant speed feed of 1 pulse/μm; that is, the discharge is effected at a constant voltage in the machining gap without controlling the discharge energy.

This constant speed feed method can satisfactorily machine a workpiece if the workpiece is constant in thickness. However, in machining a workpiece which is variable in thickness, initially it is necessary to set the machining feed speed to a value for the maximum thickness (that is, the maximum machining area) of the workpiece, so that no short-circuiting occurs and the wire-shaped electrode may not be broken. Accordingly, in the constant speed feed method, the machining feed speed is relatively low. Thus, even in machining a portion of the workpiece which is smaller in thickness than the other portions, the machining feed speed is still maintained low. Therefore, the constant speed feed method is considerably low in machining efficiency. On the other hand, it is well known in the art that even if a workpiece is constant in thickness, in order to shape a workpiece to a configuration having an angular corner it is preferable to increase the machining feed speed or to decrease the discharge energy. Because the workpiece is machined sharply, i.e., the resultant corner is not round. Thus, the constant speed feed method in which the discharge energy is maintained unchanged still involves problems to be solved.

An electrical discharge machining apparatus has been proposed in the art in order to eliminate the above-described difficulties accompanying the constant speed machining method. In the conventional apparatus, a voltage across a machining gap, i.e., a machining voltage, is detected and a machining feed speed is controlled so that the voltage thus detected is constant. The arrangement and operation of the conventional apparatus will be described with reference to FIG. 1.

A machining electric source (3) supplies a machining current to a wire electrode (1) and a workpiece (2) to be machined. The average value Eg of the machining voltage and a reference voltage Eo are applied to an error voltage amplifier (4), which determines a machining feed speed F proportional to an error voltage which is the difference value between the machining voltage Eg and the reference voltage Eo. The machining feed speed F thus determined is distributed as an X-axis component Fx and a Y-axis component Fy by a speed distributor (5), which are adapted to drive an X-axis motor (6) and a Y-axis motor (7), respectively. In this connection, the following relation is established between the machining feed speed F provided by the amplifier (4) and the outputs Fx and Fy of the speed distributor (5):

$$Fx^2 + Fy^2 = F^2$$

In the above-described arrangement, when the gap between the wire-shaped electrode (1) and the workpiece (2) becomes smaller and accordingly the machining voltage Eg becomes lower than the reference voltage Eo, the machining feed speed F is reduced and the gap is widened so that the machining voltage Eg approaches the reference voltage Eo. In contrast, when the machining voltage Eg becomes higher than the reference voltage Eo, the machining feed speed F is increased to thereby cause the machining voltage Eg to approach the reference voltage Eo. This is a system in which a machining voltage is fed back to vary the machining feed speed. In this system, the machining feed speed is increased when a relatively thin portion of the workpiece is being machined, whereas it is decreased when a relatively thick portion of the workpiece is being machined.

The employment of the above-described machining feed speed control in which the machining voltage is maintained unchanged makes it possible to eliminate to some extent the loss in machining feed speed which is involved in constant speed feed.

FIG. 2 shows the waveform of current for charging a charge-discharge capacitor. In FIG. 2, Ip is the peak value of the charging rest current, τp is the pulse width, and τr is the pause period of time. FIG. 3 is a circuit diagram showing the machining electric source (3) in FIG. 1. The electric source (3), as shown in FIG. 3, comprises a capacitor (8) which affects a machined surface roughness, a current limiting resistor (9) determining the peak value Ip of the charging current, a switching transistor (10), an oscillator (11) for determining the pulse width τp and the rest period of time τr of the machining current, and an internal DC source (12) providing a no-load voltage between the electrodes.

Depending on these electrical conditions, discharge machining energy is variable even with the average machining voltage Eg maintained unchanged. In general, in machining a workpiece relatively small in thickness the discharge machining energy is liable to concentrate at a point, and therefore it is necessary to lower the above-described electrical conditions to decrease the discharge machining energy, otherwise the wire electrode would be broken.

The machining feed speed F is so controlled that the machining voltage Eg is maintained unchanged and in machining a workpiece variable in thickness the electrical conditions are so set that the wire electrode (1) is not broken at the portion of the workpiece which is the smallest in thickness. Therefore, at the portion of the workpiece which is larger in thickness, the electrical conditions are not sufficient and accordingly the machining speed is decreased. In addition, it is known that the machining accuracy is improved by increasing the electrical conditions at the relatively large portion of the workpiece in thickness.

When the machining direction is changed as in the corner of a machining configuration, the discharging area is decreased, i.e., equivalently the thickness is decreased. Therefore, with the electrical conditions maintained unchanged, over-cutting occurs, as a result of which the accuracy of the machined corner is lowered. Accordingly, in this case, it is necessary to decrease the electrical conditions in order to machine the workpiece sharply at the corner with high accuracy.

As is apparent from the above description, the conventional constant speed feed method and the conventional machining speed control maintaining a machining voltage unchanged are disadvantageous in that in machining a workpiece variable in of variable discharge machining area, i.e., in thickness or in machining a workpiece for providing corners, the machining feed speed and the machining accuracy are unsatisfactory. Furthermore, the conventional methods are low in reliability because the electrical conditions are manually set, with the result that the machining operation depends greatly on the operator's experience and because the setting of the electrical conditions is rather difficult, with the result that the wire-shaped electrode is often broken.

SUMMARY OF THE INVENTION

Accordingly, an object of this invention is to provide electric discharge machining apparatuses with a wire-shaped electrode in which all of the above-described difficulties accompanying conventional apparatuses have been eliminated, and in which operational amplifier means is employed to automatically set the electrical conditions, namely the charge peak current Ip, pulse width $\tau p$, rest period of time $\tau r$ and capacitance C to optimum values according to variations in the discharge machining area of a workpiece.

In the apparatus according to the invention, a machining speed is detected, the machining speed thus detected in compared with a reference machining speed in an operational amplifier to thereby detect variations in the machining area of a workpiece, and in response to the thus detected variations in machining area, optimum electrical conditions in electrical discharge machining are automatically set in accordance with the variations in thickness of the workpiece.

According to the invention, the electrical conditions which have been manually set are completely automatically set, and accordingly the wire-shaped electrode will never be broken carelessly. Furthermore, in machining a workpiece whose thickness is variable, optimum electrical conditions are automatically set for the variations of the thickness. Accordingly, in the invention, unlike the prior art, the method of machining a workpiece under decreased electrical conditions corresponding to the smallest thickness of the workpiece is not employed, and therefore the machining feed speed can be greatly increased and the machining accuracy is also considerably improved.

Another object of the invention is to provide electric discharge machining apparatuses with a wire-shaped electrode in which in response to variations in discharge machining area of a workpiece, among the electrical conditions, the charge peak current Ip, pulse width $\tau p$, rest period of time $\tau r$, capacitance C and no-load voltage are completely automatically controlled to optimum values individually or in combination.

In the apparatus of the invention, the electrical conditions different in energy which have been prepared in the form of a data table with respect to the variations in thickness of a workpiece and the variations in machining area of the workpiece in an equivalent sense as in machining corners are successively read out to be subjected to comparison to obtain the optimum electrical conditions at all times. In order to detect the variations in discharge machining area, an averaged machining feed speed (for a predetermined time) is employed, and the electrical conditions are changed every predetermined time. Thus, the electrical conditions are controlled exactly in conformance to the variations in discharge machining area.

Accordingly, the electrical condition switching control of the invention, unlike the prior art, is free from the trouble that it is difficult to suitably set the electrical condition according to the variations in thickness of a workpiece. Thus, the apparatus of the invention is improved in operability and is free from the problem that the wire electrode is broken by erroneously setting the electrical conditions. The most significant merit of the invention resides in that the drawbacks accompanying the prior art apparatus such as the lowering in of machining speed can be remarkably improved. In addition, since the electrical conditions are decreased in forming a corner by machining a workpiece, the resultant corner is much sharper than that formed by conventional apparatuses. Thus, the apparatus of the invention is remarkably high in reproducibility, reliability and machining characteristics in machining workpiece of variable thickness.

DETAILED DESCRIPTION OF THE PREFERRED EMBODIMENT

Figure 1:
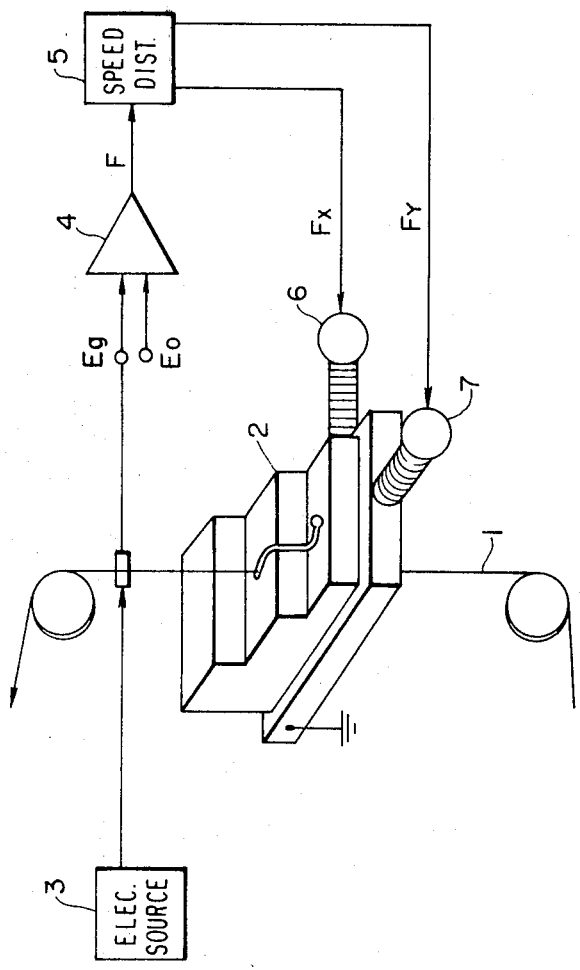
FIG. 1 is a schematic diagram showing the arrangement of a conventional apparatus.
Figure 2:
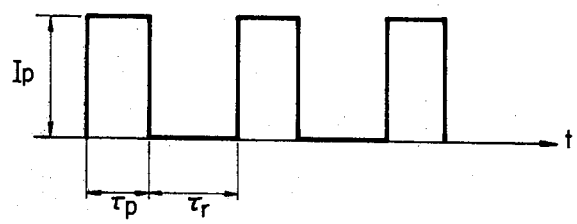
FIG. 2 is an explanatory diagram showing the waveform of a pulse current supplied to the electrodes of the apparatus.
Figure 4A:
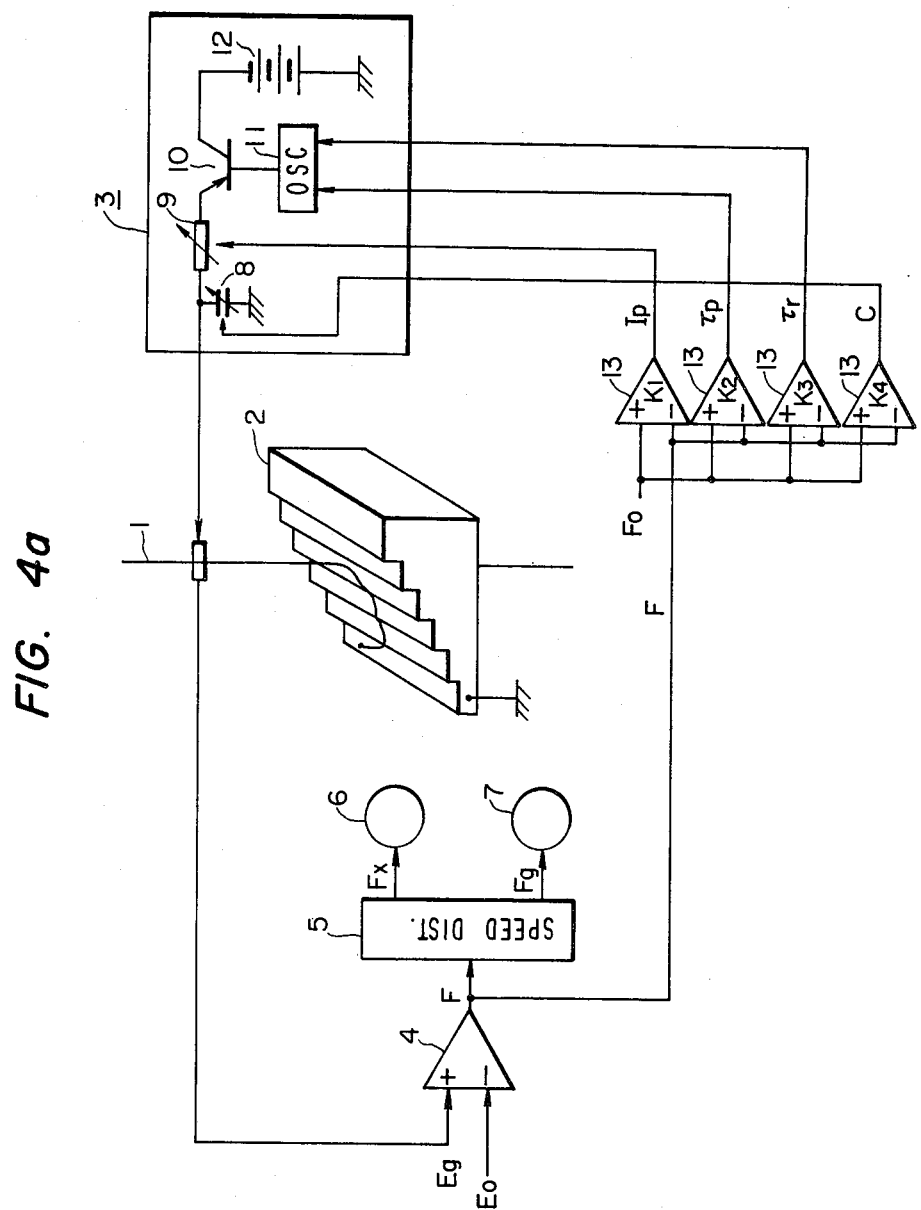
FIG. 4a is a diagram showing one example of an electric discharge machining apparatus with a wire-shaped electrode according to this invention.

FIG. 4 shows one example of an electric discharge machining apparatus with a wire-shaped electrode according to the present invention which is obtained by adding operational amplifiers (13) to the apparatus shown in FIG. 1. Data representative of a machining feed speed F and a reference feed speed Fo are applied to the operational amplifiers (13), so that output voltages Ki(Fo-F) proportional to the difference between the speeds F and Fo are applied to the pulse source (3) and machining energy is proportional to the difference between the speeds F and Fo, i.e., an electrical condition is set. In the above-described output voltages Ki(Fo-F), Ki is the proportional constant (where i=1 to 4); that is, $K_1$ through $K_4$ are coefficients provided respectively for the electrical data Ip, $\tau p$, $\tau r$ and C.

The operation of the apparatus shown in FIG. 4 will be described. Similarly as in the conventional apparatus in FIG. 1, the machining voltage Eg is compared with the reference voltage Eo, and the machining feed speed F is so controlled that the machining voltage Eg approaches the reference voltage Eo at all times.

If control is attained so that, with respect to the variations in thickness of the workpiece (2), the gap voltage between the wire-shaped electrode (1) and the workpiece (2) is maintained constant and the electrical conditions are the same, then the machining energies are substantially constant and the machining area speed is also substantially constant, and therefore the machining feed speed F is in inverse proportion to the thickness of the workpiece.

Under this condition, the machining feed speed F is applied to the operational amplifiers (13). As the machining feed speed F is decreased, the output voltages Ki(Fo-F) of the operational amplifiers (13) are increased; that is, the four electrical data Ip, $\tau p$, $\tau r$, and C are increased, so that the machining feed speed F is not so greatly decreased.

Figure 5:
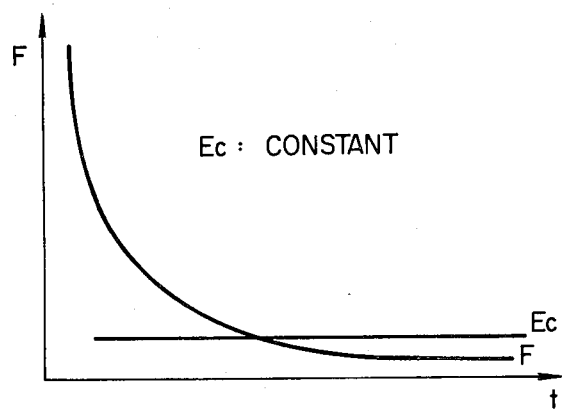
FIG. 5 is a graphical representation indicating thickness t with machining feed speed F in the conventional discharge machining apparatus under the conditions that the machining voltage is constant and the electrical condition is maintained constant.

FIG. 5 is a graphical representation indicating machining feed speed F with thickness t under the condition that, in the conventional apparatus, machining energy EC is so set that the wire-shaped electrode (1) is not broken in machining the portion of the workpiece which is smallest in thickness. In this case, the electrical conditions EC are maintained unchanged, and therefore the machining feed speed is decreased substantially in inverse proportion to the thickness t.

Figure 6:
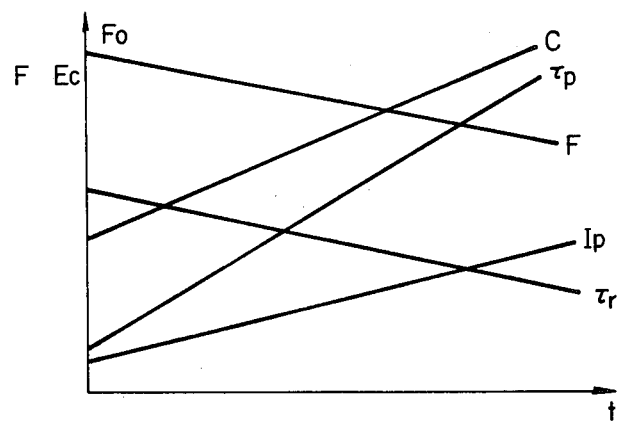
FIG. 6 is a graphical representation indicating electrical conditions and machining feed speeds with respect to variations in thickness of a workpiece under the conditions that optimum conditions are set according to the invention.

FIG. 6 is also a graphical representation indicating machining feed speed F with thickness t under the condition that, in the apparatus according to the invention, the optimum electrical condition EC is automatically set. In this case, as the thickness t increases, the electrical condition EC increases, that is, the electrical data Ip, $\tau p$ and C increase while the electrical data $\tau r$ decreases. Accordingly, the machining feed speed F is not so greatly decreased with respect to the reference feed speed Fo; however, it has a negative inclination because, as the pause period of time $\tau r$ decreases, the machining energy increases.

In general, during a machining operation, it is difficult to detect the thickness t, and therefore the electrical condition EC can be determined by utilizing the fact that the thickness t is substantially in proportion to the machining feed speed F. If the machining feed speed F and electrical condition EC indicated in FIG. 6 are approximated with straight lines, then $$F = Fo - at, \text{ where } a > 0 \quad (1)$$

$$Ip = b_1 t, \ \tau p = b_2 t, \ \tau r = b_3 t, \text{ and } C = b_4 t \quad (2)$$

where a and $b_1$, $b_2$, $b_3$ and $b_4$ (represented by "$b_i$") are the constants representing the inclinations of the straight lines F, Ip, $\tau p$, $\tau r$ and C in FIG. 6, respectively, and t is the thickness.

Eliminating the thickness t from the above equations, the following equation (3) is obtained:

$$Ip, \ \tau p, \ \tau r \text{ or } C = b_i \times Fo - F/a = Ki(Fo - F) \quad (3)$$

where Ki is the constant, and $Ki = b_i/a$

This means that, if the output voltages Ki(Fo−F) are provided by the operational amplifiers (13) and electrical data proportional to the output voltages are applied to the pulse source (3), then the electrical condition EC is automatically set with respect to the thickness t.

Figure 4B:
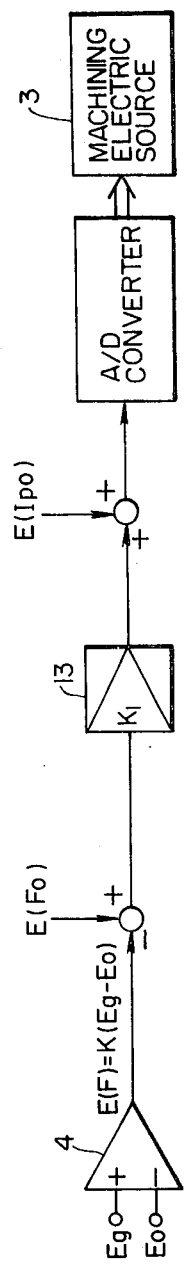
FIG. 4b is an explanatory diagram for a description of a method of changing electrical conditions according to a machining feed speed signal.

This will be described in more detail. FIG. 4b shows a technical concept of how the peak value Ip of the pulse current is varied. It should be noted that the technical concept can be similarly applicable to variations of the other electrical conditions such as pulse width $\tau p$, rest period of time $\tau r$ and capacitance C.

If, during a machining operation, the thickness t increases, then Eg<Eo, and therefore E(F)′=K(Eg−Eo)<0 and |E(F)|<|E(F)′|, where K is the constant, E(F) is the voltage value corresponding to the machining feed speed F before the thickness increases, and E(F)′ is the voltage value corresponding to the machining feed speed after the thickness increases.

The voltage value E(F)′ is added to the voltage E(Fo) corresponding to the reference feed speed. In this case, E(Fo)−E(F)<E(Fo)−E(F)′ where E(F) is the voltage value corresponding to the machining feed speed before the thickness increases. The increased E(Fo)−E(F)′ is applied to the operational amplifier (13), so that a voltage value E(Ip)′ corresponding to the amount of increase (being a voltage value corresponding to the peak current value) is outputted by the amplifier (13). A value E(Ipo) (which is the value of the EC axis segment in FIG. 6) is added to the value E(Ip), and the resultant value is applied to the machining source (3), and Ip corresponding to E(Ip′)+E(Ipo) is selected. The analog data E(Ip)′+E(Ipo) is converted into a digital data by an analog-to-digital (A/D) converter before applied to the machining source (3), if necessary.

In the case where the thickness of the workpiece decreases, $Eg > Eo$, $E(F)'' > 0$ and $|E(F)| < |E(F)''|$. As a result, $E(Fo) - E(F) > E(Fo) > E(Fo) - E(F)''$. The $E(F)''$ is the voltage value corresponding to the machining feed speed when the thickness decreases.

The electrical data can be changed as described above.

Since the electrical condition EC has the parameters, namely, the charge peak current Ip, the rest period of time $\tau r$, the pulse width $\tau p$ the capacitance C and the like, there may be a variety of electrical conditions with the same machining energy. However, in general, the most stable parameters should be selected through experiment.

In the above-described examples, the operational amplifier is employed so that the resistance is varied in proportion to the output of the operational amplifier to set the data Ip, and the oscillator 11 is controlled to vary the pulse with $\tau p$ and the rest period of time $\tau r$, while the capacitance is automatically set. However, instead of the operational amplifiers 13, a number of comparators may be connected in such a manner that various data are applied to first input terminals of the comparators. In this case, the comparators provide digital outputs. Therefore, if the digital outputs are utilized to operate (on and off) switches provided for the relevant electrical data, the same effects described above can be obtained.

In the circuit shown in FIG. 4, although the electrical data are set immediately in response to the feed speed F, it should be noted that, since the feed speed F is somewhat varied during machining, the electrical data are also varied. The variations of the electrical data result in machining energy variations, which affects the feed speed F. Thus, the control system becomes unstable as a whole, as a result of which the electrical data are greatly varied and the wire-shaped electrode may be broken by momentary excessive energy.

Figure 7:
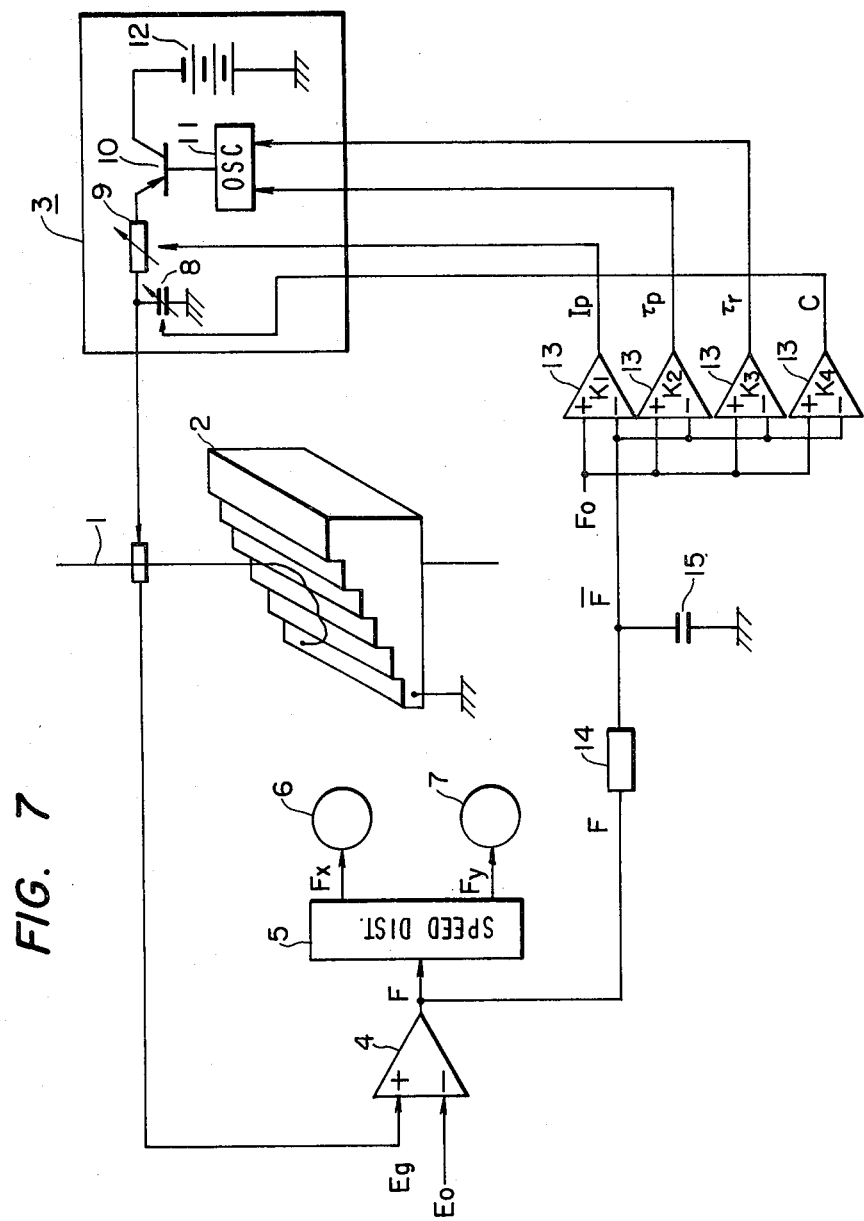
FIG. 7 is an explanatory diagram showing another example of the apparatus of the invention, in which the machining feed speed is averaged by a low-pass filter and electrical conditions are set.

This difficulty is eliminated by another example of the apparatus according to the invention shown in FIG. 7. In this example, a low-pass filter consisting of a resistor (14) and a capacitor (15) is employed to apply the average value $\bar{F}$ of the feed speed F to the amplifiers (13), so that a constant voltage is applied to the amplifiers (13), and the electrical data provided for the pulse source (3) are made stable.

Figure 8:
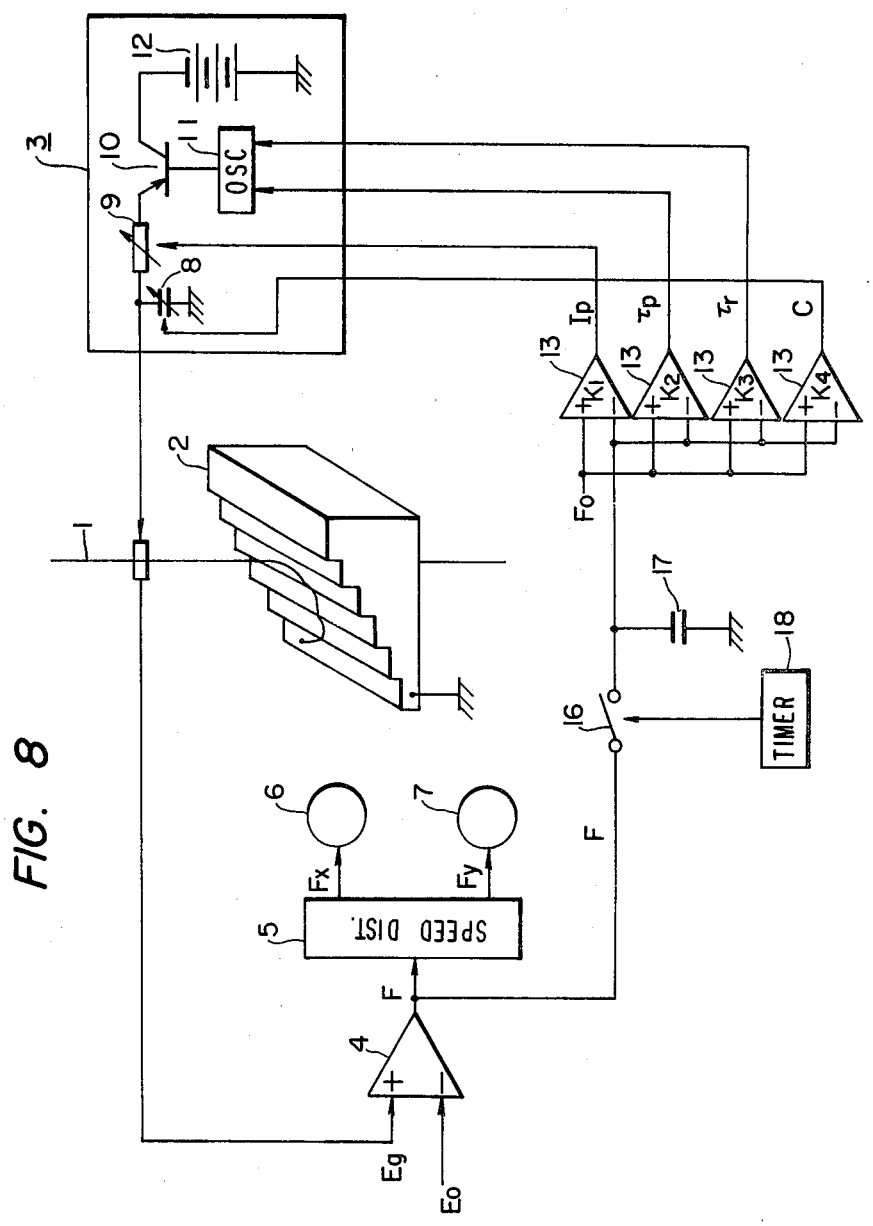
FIG. 8 is an explanatory diagram showing a further example of the apparatus according to the invention, which is modified by adding to the apparatus in FIG. 4a a circuit for sampling the feed speed at predetermined time intervals.

A circuit shown in FIG. 8 is also practical to stabilize the control system. The circuit comprises a sample-and-hold switch (16), a sample-and-hold capacitor (17) and a timer (18) adapted to close the switch (16) momentarily at predetermined time intervals. That is, a feed speed at a time instant is stored in the capacitor (17), and the capacitor (17) continuously holds a constant value until the switch (16) is closed by the timer (18) again. In other words, the voltage applied to the operational amplifiers (13) is maintained held for a period of time, during which the electrical condition is maintained unchanged.

Figure 9:
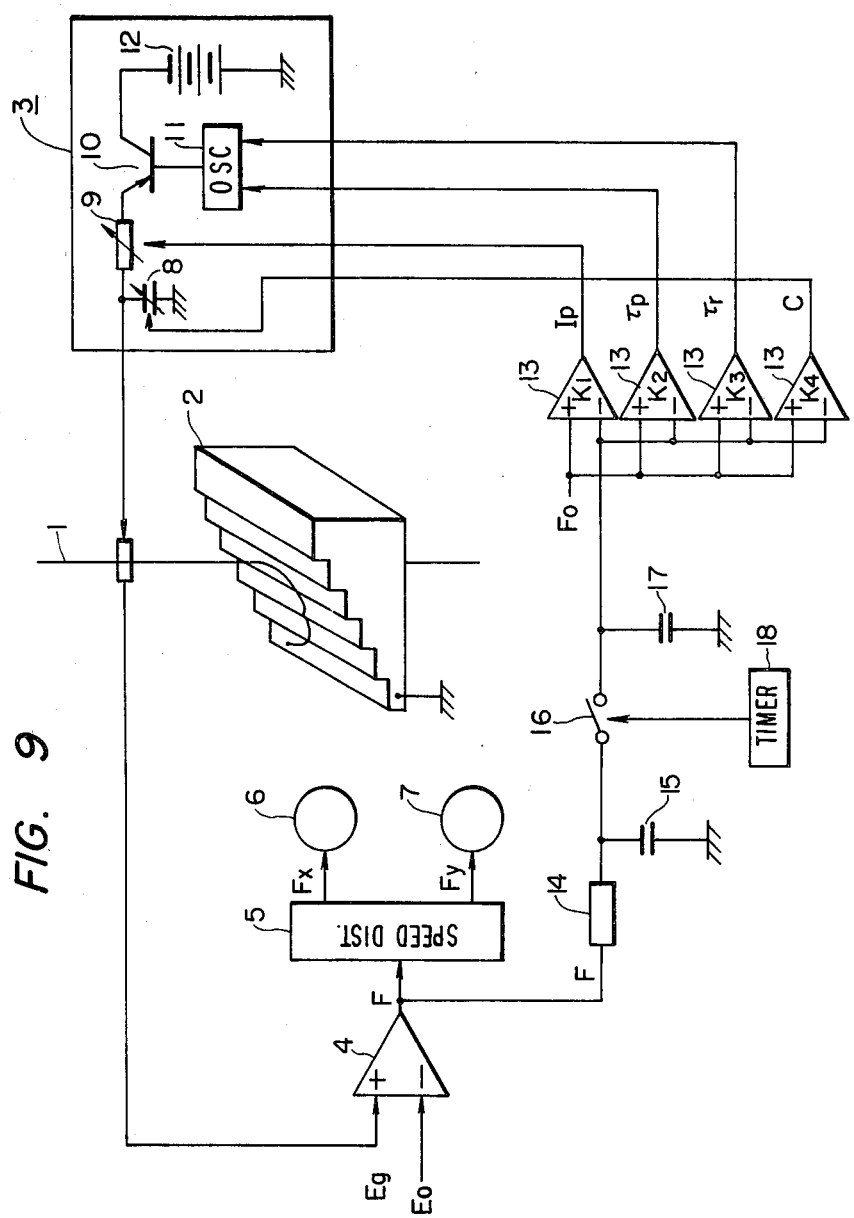
FIG. 9 is an explanatory diagram showing a still further example of the apparatus of the invention, which has the functions of the low-pass filter in FIG. 7 and of the feed speed sampling circuit in FIG. 8.

A circuit shown in FIG. 9 is obtained by adding a sample-and-hold switch (16), a sample-and-hold capacitor (17) and a timer (18) to the low-pass filter shown in FIG. 6. In this case, a considerably stable control system can be provided, because even when the switch (16) is closed by the timer (18), the voltage across the capacitor (17) is not greatly changed, and accordingly the electrical data are slightly changed every predetermined time.

In the above-described examples, the switch (16) is closed momentarily by the timer every predetermined time. However, the same effects described above can be obtained by utilizing a machined distance detector instead of the timer in such a manner that the switch (16) is closed whenever the workpiece is machined for a predetermined distance.

In the above-described examples, the electrical condition and the machining feed speed are approximated with straight lines with respect to the thickness t of a workpiece. However, more accurate control can be carried out by performing approximation as shown in FIG. 6 with operational amplifiers having non-linear circuits.

Figure 10:
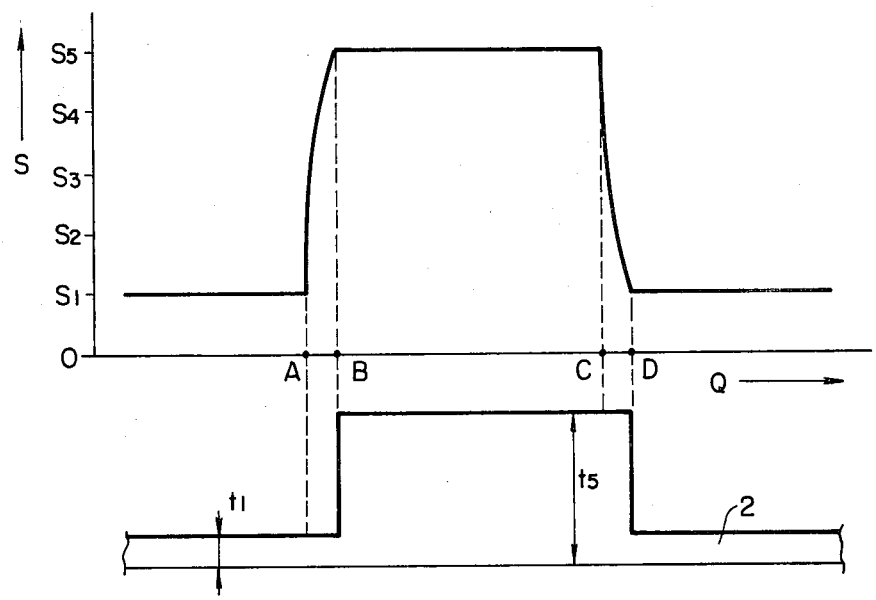
FIG. 10 is a graphical representation indicating variations in discharge machining area of a workpiece with respect to variations in thickness of the workpiece.

This invention is further intended to control the electrical data completely in accordance with a discharge area. As conductive to a full understanding of this, variations of the discharge area with respect to variations of the thickness of the workpiece will be described. In FIG. 10, the horizontal axis indicates the positions of the wire-shaped electrode (1) in machining the workpiece (2) which is variable from $t_1$ to $t_5$ in thickness whereas the vertical axis indicates the values $S_1$-$S_5$ of the discharge area S which corresponds to $t_1$-$t_5$, respectively. In the figure, the machining direction is designated by an arrow Q.

As is apparent from FIG. 10, in the case where the thickness of the workpiece is increased from $t_1$ to $t_5$, when the wire-shaped electrode (1) reaches the position A, electrical discharge occurs between the electrode (1) and the end face of the portion of the workpiece, which is $t_5$ in thickness. In other words, in the case where the thickness is abruptly increased from $t_1$ to $t_5$, the discharge area is not abruptly increased from $S_1$ to $S_5$; that is, the discharge area is gradually increased from $S_1$ through $S_2$, $S_3$ and $S_4$ to $S_5$. In FIG. 10, the distance AB is theoretically the sum of the radius of the wire-shaped electrode (1) and the discharge gap.

In the case where the thickness is decreased from $t_5$ to $t_1$, similarly as in the above-described case, the discharge area is not abruptly decreased from $S_5$ to $S_1$ at the position D; that is, it begins decreasing at the position C, then decreases gradually and finally decreases to $S_1$ at the position D.

It goes without saying that, if the discharge area based on the wire electrode (1) and the discharge gap are computed and graphed under the condition that theoretically the discharge gap is maintained unchanged even when the thickness changes, as shown in FIG. 10, then $AB = CD$.

In the case where the thickness is increased from $t_1$ and $t_5$ or decreased from $t_5$ to $t_1$ (especially where the thickness is changed abruptly as in a configuration having right angles), practically the intermediate thickness $t_2$, $t_3$ and $t_4$ are included, and therefore it is necessary to vary the electrical data in accordance with these different thicknesses.

However, if the electrical data are abruptly changed because of the abrupt change in thickness at the positions B and D corresponding to both end faces of the workpiece's portion $t_5$ in thickness, then the following problems will occur. It is assumed that the thickness is increased from $t_1$ to $t_5$. If the electrical data for the thickness $t_1$ is changed to the data for the thickness $t_5$ at the position B, the portion A-B of the workpiece is machined with the decreased electrical data for the thickness $t_1$. Therefore, as the discharge area increases gradually, the machining speed is decreased resulting in a lot of loss. In contrast, it is assumed that the thickness is decreased from $t_5$ to $t_1$. If the electrical data for the thickness $t_5$ is changed to the data for the thickness $t_1$ at the position D, then the machining is carried out with the electrical data for the thickness $t_5$ although the thickness of the portion C-D is smaller than the thickness $t_5$. Accordingly, in this case, the current density is increased, or the discharge energy is concentrated at one point, and therefore the wire-shaped electrode is liable to be broken. Experimentally, the value AB (=CD) is, in general, 0.15 to 0.2 mm (in the case of a wire-shaped electrode 0.2 mm in diameter). This value is a distance long enough to break the wire electrode.

Figure 11:
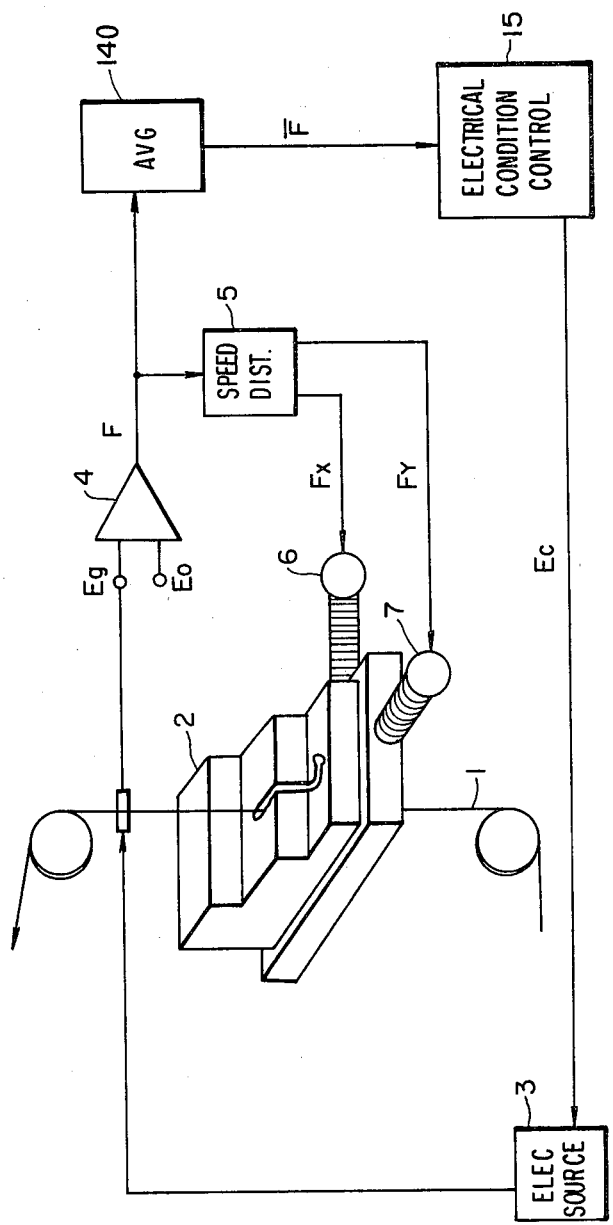
FIG. 11 is a schematic diagram showing an arrangement of the apparatus according to the invention.

FIG. 11 shows another example of the apparatus according to the invention. In the apparatus in FIG. 11, similarly as in the apparatus shown in FIG. 1, the machining voltage Eg is compared with the reference voltage Eo, and the machining feed speed F is so controlled that the machining voltage Eg approaches the reference voltage Eo at all times. As described with reference to FIG. 1, the machining feed speed F proportional to the error voltage is averaged in an arithmetic circuit 140, so as to be outputted as a machining feed speed average value $\bar{F}$ every predetermined time.

The average value $\bar{F}$ is applied to an electrical condition control device 150, in which, for the inputted average value $\bar{F}$, an electrical condition Ec most suitable for a thickness being machined is selected from a data table which provides electrical conditions Ec for machining feed speed average values $\bar{F}$, respectively, and the electrical condition Ec thus selected is applied to the machining electric source (3).

Figures 12, 13:
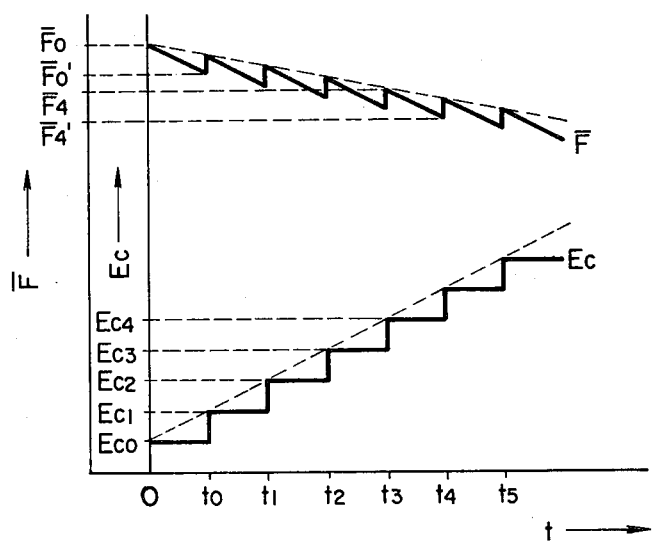
FIG. 12 is a diagram showing one example of an electrical condition table.
FIG. 13 is a explanatory diagram for a description of an automatic electrical condition setting system according to the invention.

FIG. 12 shows one example of the data table which is stored in memory means in the electrical condition control device 150. In the data table, as shown in FIG. 12, for various thicknesses of a workpiece there are provided electrical conditions and the upper limit values $\bar{F}u$ and lower limit values $\bar{F}d$ of machining feed speed average values $\bar{F}$, respectively.

FIG. 13 is a graphical representation for a description of an automatic electrical condition setting system according to the invention. In FIG. 13, the horizontal axis indicates thickness t ($t_0 < t_1 < \ldots < t_4 < \ldots$), whereas the vertical axis indicates machining feed speed average value $\bar{F}$ and electrical condition Ec. As is apparent from FIG. 13, for a thickness between 0 and $t_0$ an electrical condition $Ec_0$ is provided and a machining feed speed average value $\bar{F}$ is between $\bar{F}_0$ and $\bar{F}_0'$; and for a thickness between $t_0$ $t_1$ an electrical condition $Ec_1$ is provided and a machining feed speed average value f is between $\bar{F}_1$ and $\bar{F}_1'$.

The principle of operation will be described with reference to FIGS. 12 and 13 in detail. It is assumed that a workpiece's portion whose thickness t is between $t_3$ and $t_4$ ($t_3 < t < t_4$) is machined under the electrical condition $Ec_4$. In this case, the machining feed speed average value $\bar{F}$ is between $\bar{F}_4$ and $\bar{F}_4'$. Furthermore it is assumed that under this condition, the machining operation is advanced to another portion whose thickness t is between $t_1$ and $t_2$ ($t_1 < t < t_2$). In this case, the electrical condition $Ec_4$ is still maintained, and therefore the machining feed speed average value $\bar{F}$ is increased to be $\bar{F} > \bar{F}_4$; that is, it exceeds the upper limit value $\bar{F}_4$ of the electrical condition $Ec_4$. Accordingly, the electrical condition control device 150 decreases the electrical condition by one step, i.e., it applies the electrical condition $Ec_3$ to the machining electric source 3. The upper limit value Fu corresponding to the electrical condition $Ec_3$ is $\bar{F}_3$. However, the actual thickness t is between $t_1$ and $t_2$ ($t_1 < t < t_2$) as described above, i.e., it is smaller than the thickness ($t_2 < t < t_3$) corresponding to the electrical condition $Ec_3$, and therefore the machining feed speed average value $\bar{F}$ exceeds the upper limit value $\bar{F}_3$.

Accordingly, in the electrical condition control device 150, the electrical condition $Ec_3$ is decreased by one step according to the data table; that is, the electrical condition $Ec_2$ is outputted. Since the thickness of the workpiece's portion is between $t_1$ and $t_2$, the machining feed speed average value $\bar{F}$ is between $\bar{F}_2$ and $\bar{F}_2''$, and the electrical condition control device 150 outputs this electrical condition $Ec_2$ continuously.

In the case also where the thickness increases, similarly as in the above described case, a suitable electrical condition is selected so that the present machining feed speed average value $\bar{F}$ is between the upper limit value $\bar{F}u$ and the lower limit value $\bar{F}d$.

By way of example, the selection of a suitable electrical condition will be described with respect to the peak current Ip.

Figure 14:
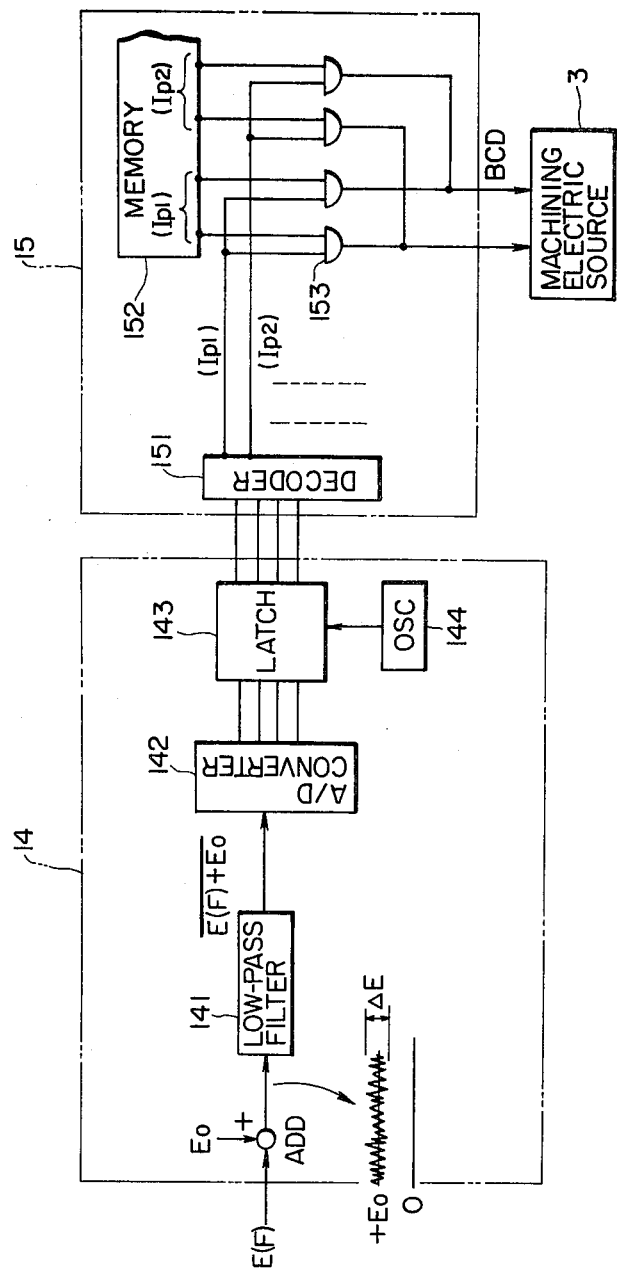
FIG. 14 is a block diagram showing an operational amplifier circuit and an electrical condition control device.
Figure 15:
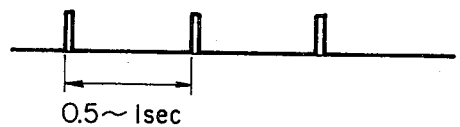
FIG. 15 is a diagram showing the waveform of a clock pulse signal outputted by an oscillator.

In a circuit shown in FIG. 14, a voltage E(F) (which is a voltage value corresponding to a machining feed speed F) is added to a reference voltage EO(+). The resultant value E(F)+Eo is averaged into a value $\overline{E(F)+Eo}$ by a low-pass filter (141) and is then converted into a digital data by an analog-to-digital converter (142). The digital data is applied to a latch circuit (143). The latch circuit (143) stores and outputs the digital data with the timing of the rise of a clock pulse generated by an oscillator (144); that is, the latch circuit (143) holds the digital data until the rise of the following clock pulse. The clock pulse is outputted by the oscillator (144) every 0.5 to 1 sec. as shown in FIG. 15.

Figure 3:
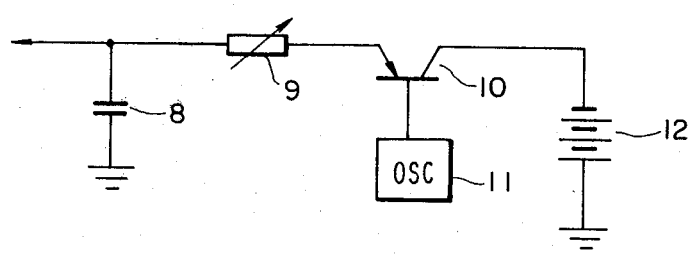
FIG. 3 is a circuit diagram showing a machining electric source.

The output of the latch circuit (143) is applied to a decoder (151), where the output bits corresponding to the data are raised from "0" to "1". In FIG. 14, the A/D converter (142) is a 4-bit A/D converter, and therefore the decoder (151) can provide sixteen different outputs. The 2-bit data of peak currents Ip have been stored in a memory (152) in advance. Therefore, the memory (152) can provided four different peak current data Ip. When the output of the decoder (151) is supplied to a line $Ip_1$, a 2-bit data corresponding to the line $Ip_1$ is applied through an AND circuit (153), as a binary coded decimal number (BCD), to the machining electric source (3). In response to the binary coded decimal number, the machining electric source (3) causes a relay or the like (not shown) to operate to control the resistor (9) in FIG. 3.

Figure 16:
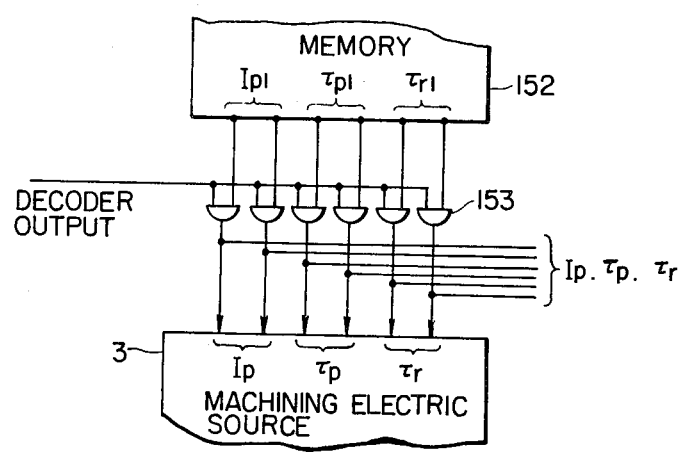
FIG. 16 is a block diagram showing a part of the electrical condition control device.

The selection of a suitable electrical condition has been described with respect to Ip; however, this technical concept can be similarly applied to the selection of the electrical data $\tau p$ and $\tau r$. If, as shown in FIG. 16, the output bit data ($Ip_1$) of the decoder (151) is connected to other AND circuits (153) provided for the electrical data $\tau p_1$ and $\tau r_1$, then the electrical data $Ip_1$, $\tau p_1$ and $\tau r_1$ can be applied, in combination, to the machining electric source (3). In FIG. 16, the other data (sixteen different data) similar to the electrical data $Ip_1$, $\tau p_1$ and $\tau r_1$ are applied to lines $Ip_n$, $\tau p_n$ and $\tau r_n$. These data are selected in response to the other output bit data of the decoder (151).

For instance, when the thickness increases, in general Eg < Eo and therefore the value Eo+E(F) is decreased. Accordingly, the output bit data of the A/D converter (142) is lower in weight. Thus, in this case, the output of the decoder (151) should be coupled to the memory (152) so that a high energy electrical condition is selected from the memory (142). It goes without saying that when the thickness decreases, a method opposite to the above-described one should be employed.

As described above, a variety of data can be made available by changing the connection between the output of the decoder and the memory or the contents of the memory.

In the apparatus of the invention, for example as shown in FIG. 11, the machining feed speed F determined by the error amplifier (4) is applied to the averaging circuit 140, where it is averaged every predetermined time. The reason for this will be described.

In an actual machining operation, control is made with a machining feed speed F so as to cause the average machining voltage Eg to approach the reference voltage Eo, and therefore the machining feed speed F is variable. In addition, the machining feed speed F sometimes greatly varies when the interelectrode discharge changes, or when the wire-shaped electrode changes in tension, or because the wire-shaped electrode has a non-uniform diameter, or because of external effects. If, in this case, the electrical condition is changed in accordance with the machining feed speed F which varies with time as described above, then the electrical condition is unstable while the thickness is constant. Further, if the electrical condition is changed to be higher in electrical energy, then at worst the wire-shaped electrode is broken. In machining a workpiece whose thickness is variable or in machining a workpiece to provide a corner, it is difficult to obtain electrical conditions exactly according to the discharge area, and the wire-shaped electrode is therefore broken or a loss is involved in machining feed speed. Especially in the machining of a corner, the machining direction is often abruptly changed, and therefore in the initial machining the wire-shaped electrode is liable to bite the end face of the corresponding portion of the workpiece. This will greatly change the machining feed speed F, as a result of which the electrical condition is also greatly changed resulting in a so-called "hunting state", or the wire electrode may be broken.

Because of the above-described various factors, according to the invention, instead of the machining feed speed F which varies with time, the machining feed speed F which is averaged to a certain extent is employed. This machining feed speed average value $\bar{F}$ does not respond to momentary external effects and other variations. Therefore, with the machining feed speed average value $\bar{F}$, portions of a workpiece where its thickness changes or corners should be provided can be accurately machined. Furthermore, according to the invention the average value is obtained every predetermined time, and therefore an actual machining operation can be carried out separately according to a portion of a workpiece for which the machining feed speed average value $\bar{F}$ should be changed and a portion of the workpiece for which the average value should be maintained unchanged. According to the experiments made by the inventor, the above-described predetermined time is preferably within a range of 0.5 sec to 1 sec. With this time range, not only is an ordinary machining operation carried out, but also a portion of a workpiece where the thickness changes or where a corner should be provided can be satisfactorily machined; that is, the apparatus of the invention can satisfactorily respond to transient phenomena which may be involved in a workpiece machining operation.

In the apparatus according to the invention, the time intervals for changing the electrical condition are of the same as the above-described time intervals; that is, the time intervals are also set to 0.5 to 1 sec by sufficiently taking into consideration the response of machining feed speed due to the change of the electrical condition. It goes without saying that, if the time intervals are set to an excessively large value, then a trouble occurs that, although a thickness change has been detected, the electrical condition is not changed. If this trouble occurs when the thickness decreases, then the wire electrode may be broken.

In the above-described apparatus of the invention, the arithmetic circuit or averaging circuit and the electrical condition control device and the like may be replaced by a computer so that a variety of data in a wider range can be stored and processed. In this case, the application range of the apparatus of the invention is further increased. The electrical data, namely, the charge peak current Ip, the pulse width $\tau p$, the rest period of time $\tau r$, the capacitance and the no-load voltage can be controlled individually or in combination. In this connection, if the data table is experimentally prepared in advance depending on the most important one of the machining feed speed, machining accuracy and machined surface roughness the data table is prepared through experiment in advance, then a variety of machining operations can be achieved with the apparatus of the invention.

We claim:

1. In an electric discharge machine (EDM) apparatus of the type wherein machining is caused by translating a wire electrode with respect to a workpiece at a machining feed speed and generating an electric discharge across a gap between said electrode and workpiece, said machining feed speed being controlled to maintain a substantially constant voltage across said gap, said EDM apparatus including means for generating a machining feed speed signal in accordance with said machining feed speed, a machining electric source for maintaining desired machining electrical conditions in accordance with control signals, and arithmetic means responsive to said machining feed speed signal for generating said control signals, the improvement characterized in that said arithmetic means comprises averaging means responsive to said machining feed speed signal for generating an averaged signal representing the average machining feed speed, said arithmetic means generating said control signals in accordance with said averaged signal, and said machining electric source changing its electrical conditions at predetermined intervals as said wire electrode continuously translates with respect to said workpiece.

2. An EDM apparatus as claimed in claim 1, wherein said predetermined interval is an interval required for said wire electrode to translate a predetermined distance with respect to said workpiece.

3. An EDM apparatus as claimed in claim 1, wherein said predetermined interval is a predetermined period of time.

4. An EDM apparatus as claimed in claim 3, wherein said machining electric source receives continuously changing control signals from said arithmetic means and changes its electrical conditions only at said predetermined time intervals.

5. An EDM apparatus as claimed in claim 3, wherein said machining electric source continuously changes its machining electrical conditions in accordance with the control signal received from said arithmetic means, said arithmetic means changing its control signals at said predetermined time intervals.

6. An EDM apparatus as claimed in claim 4 or 5, wherein said predetermined time interval is substantially in the range of 0.5 to 1.0 seconds.

7. An EDM apparatus as claimed in claim 5, wherein said arithmetic means comprises sample-and-hold means for sampling said averaged signal at a sampling interval and holding said sampled averaged signal for said sampling interval, said sampling interval being equal to said predetermined time interval and said arithmetic means generating its control signals in accordance with the output of said sample-and-hold means.

8. In an electric discharge machining (EDM) apparatus of the type wherein machining is caused by translating a wire electrode with respect to a workpiece at a machining feed speed and generating an electric discharge across a gap between said electrode and workpiece, said machining feed speed being controlled to maintain a substantially constant voltage across said gap, said EDM apparatus including means for generating a machining feed speed signal in accordance with said machining feed speed, a machining electric source for maintaining desired machining electrical conditions in accordance with control signal, and electrical condition control means for generating said control signals, the improvement comprising:
arithmetic means responsive to said machining feed speed signal for generating an averaged signal representing an average machining feed speed; and
said electrical condition control means storing a plurality of electrical conditions and reading out said electrical conditions as said control signals in response to the output of said arithmetic means, said machining electric source changing its electrical conditions at predetermined intervals as said wire electrode continuously translates with respect to said workpiece.

9. An EDM apparatus as claimed in claim 8, wherein said arithmetic means includes averaging means responsive to said machining feed speed signal for providing an averaged signal representing an average value of said machining feed speed, and sample-and-hold means for sampling said averaged signal at a sampling interval and holding said sampled averaged signal for said sampling interval, said sampling interval being equal to said predetermined interval.

10. An EDM apparatus as claimed in claim 8, wherein said predetermined interval is a time interval substantially between 0.5 and 1.0 seconds.

11. An EDM apparatus as claimed in claim 9, wherein said arithmetic means includes analog-to-digital (A/D) conversion means for converting the output of said averaging means into a digital averaged signal, said sample-and-hold means comprising a source of sampling clock signals at said predetermined interval and latch means responsive to said sampling clock signals for latching said digital averaged signal.

12. An EDM apparatus as claimed in claim 8, wherein said electrical condition control means stores upper and lower machining feed speed limit values corresponding to each set of electrical conditions, said electrical condition control means comparing said arithmetic means output with the upper and lower limit values corresponding to the machining electrical conditions currently being maintained by said machining electric source, said electrical condition control means successively increasing or decreasing its control signals in accordance with the results of said comparison until the output of said arithmetic means is between the upper and lower limit values of the electrical conditions currently being maintained.

13. An EDM apparatus as claimed in claim 8, wherein said electrical condition control means stores a set of electrical conditions corresponding to each machining feed speed, said set of electrical conditions including a peak current, pulse width, rest period and capacitance for said machining electric source.

14. An EDM apparatus as claimed in claim 1, wherein said means for generating a machining feed speed signal comprises means for detecting the thickness of said workpiece and means for generating a machining feed speed signal which decreases with increasing workpiece thickness.

15. An EDM apparatus as claimed in claim 14, wherein said electric discharge across said gap is generated by applying a pulse current signal between said electrode and workpiece, said pulse current signal having a pulse width, a pulse peak value and a rest interval between pulses, said arithmetic means generating a first control signal for increasing said pulse peak value in response to decreasing machining feed speed.

16. An EDM apparatus as claimed in claim 15, wherein said arithmetic means generates a second control signal for increasing said pulse width in accordance with decreasing machining feed speeds.

17. An EDM apparatus as claimed in claim 15, wherein said machining electric source changes its electrical conditions with increasing workpiece thickness until a maximum pulse current signal value is reached, and thereafter increases said machining feed speed signal to correspond to said maximum pulse current signal value.

18. An EDM apparatus as claimed in claim 15, wherein said arithmetic means generates a further control signal for decreasing said rest interval with decreasing machining feed speed.

19. An EDM apparatus as claimed in claim 15, wherein said arithmetic means generates a further control signal for increasing a capacitance between said workpiece and electrode in accordance with decreasing machining feed speed.

20. An EDM apparatus as claimed in claim 14, wherein said means for generating said machining feed speed signal generates said machining feed speed signal in accordance with a voltage between said electrode workpiece.

21. An EDM apparatus as claimed in claim 8, wherein said means for generating a machining feed speed signal comprises means for detecting the thickness of said workpiece and means for generating a machining feed speed signal which decreases with increasing workpiece thickness.

22. An EDM apparatus as claimed in claim 21, wherein said electric discharge between said electrode and workpiece is generated by applying a current signal between said electrode and workpiece, said current signal having a pulse peak value, a pulse width and a rest interval between pulses, said electrical condition control means reading out a first control signal for increasing said pulse peak value in accordance with decreasing machining feed speed.

23. An EDM apparatus as claimed in claim 22, wherein said electrical condition control means reads out a second control signal for increasing said pulse width in response to decreasing machining feed speed.

24. An EDM apparatus as claimed in claim 22, wherein said machining electric source changes its electrical conditions with increasing workpiece thickness until a maximum pulse current signal value is reached, and thereafter increases said machining feed speed signal to correspond to said maximum pulse current signal value.

25. An EDM apparatus as claimed in claim 22, wherein said electrical condition control means reads out a further control signal for decreasing said rest interval in response to decreasing machining feed speed.

26. An EDM apparatus as claimed in claim 22, wherein said electrical condition control means reads out a further control signal for increasing a capacitance between said electrode and workpiece in response to decreasing machining feed speed.

27. An EDM apparatus as claimed in claim 20, wherein said means for generating said machining feed speed signal generates said machining feed speed signal in accordance with a voltage between said electrode and workpiece.

* * * * *